United States Patent

Bartholomew

[11] Patent Number: 5,853,204
[45] Date of Patent: Dec. 29, 1998

[54] MEANS OF COUPLING NON-THREADED CONNECTIONS

[75] Inventor: Donald D. Bartholomew, Mt. Clemens, Mich.

[73] Assignee: Proprietary Technology, Inc., Bloomfield Hills, Mich.

[21] Appl. No.: 503,454

[22] Filed: Jul. 17, 1995

Related U.S. Application Data

[63] Continuation-in-part of PCT/US92/08007 Sep. 21, 1992.

[51] Int. Cl.⁶ .............................. F16L 35/00; F16L 37/12
[52] U.S. Cl. ......................... 285/305; 285/321; 285/272
[58] Field of Search ................................... 285/305, 319, 285/321, 308, 272

[56] References Cited

U.S. PATENT DOCUMENTS

| | | |
|---|---|---|
| 2,167,258 | 7/1939 | Wilson . |
| 3,404,904 | 10/1968 | Roe ......................................... 285/305 |
| 3,584,902 | 6/1971 | Vyse ....................................... 285/305 |
| 3,637,240 | 1/1972 | Meher ..................................... 285/305 |
| 3,756,632 | 9/1973 | Riggs et al. . |
| 4,526,411 | 7/1985 | Bartholomew . |
| 4,712,813 | 12/1987 | Passerel et al. . |
| 4,725,081 | 2/1988 | Bauer ...................................... 285/305 |
| 4,828,297 | 5/1989 | Tarum ..................................... 285/305 |
| 5,064,227 | 11/1991 | Spors et al. . |
| 5,112,084 | 5/1992 | Washizu .................................. 285/319 |
| 5,154,451 | 10/1992 | Washizu .................................. 285/319 |
| 5,207,462 | 5/1993 | Bartholomew . |
| 5,350,203 | 9/1994 | McNaughton et al. ................. 285/305 |
| 5,423,577 | 6/1995 | Ketcham ................................. 285/305 |
| 5,492,374 | 2/1996 | Sauer et al. ............................. 285/305 |
| 5,551,732 | 9/1996 | Bartholomew ......................... 285/305 |
| 5,655,796 | 8/1997 | Bartholomew ......................... 285/305 |

OTHER PUBLICATIONS

PCT/US92/02511; filed Mar. 31, 1992 (Int'l. Publ. No. WO 93/20377; Int'l. Publ. date Oct. 14, 1993).

*Primary Examiner*—Eric K. Nicholson
*Attorney, Agent, or Firm*—Harness, Dickey & Pierce, PLC

[57] ABSTRACT

A conduit coupling comprises a male conduit, a mating female member. The male conduit is constrained as part of the conduit leading to the coupling. The male conduit includes a member for limiting the movement of the male conduit within the female member, means for sealing, and a retainer to couple the male conduit to the female member. The female member is defined as an open port, and it is possible to be no more in diameter and depth than a screw-in connection. The connection may be a quick-connect type (in which case a tool is required for disconnection) or a non-quick-connect type (in which case a tool is required for connection and disconnection). The male conduit may either be composed of a substantially non-elastic material such as a metal or a plastic or a substantially elastic material such as a soft plastic or a hard rubber. If composed of an elastic material, the bulged area is formed by use of a rigid liner having a formed bulged area that is inserted into the elastic conduit. Regardless of its material composition, the design of the present invention allows for rotational movement of the male conduit within the female member while restricting axial translation of the conduit within the member.

32 Claims, 8 Drawing Sheets

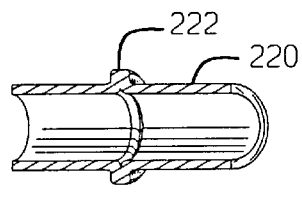
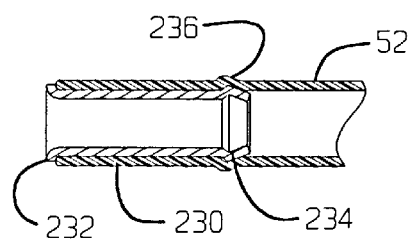
FIG 8          FIG 9
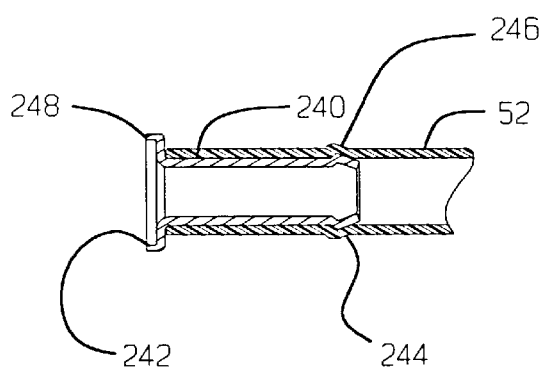
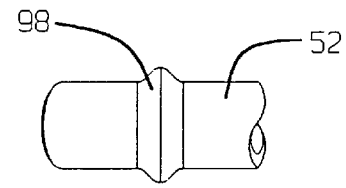
FIG 10          FIG 11

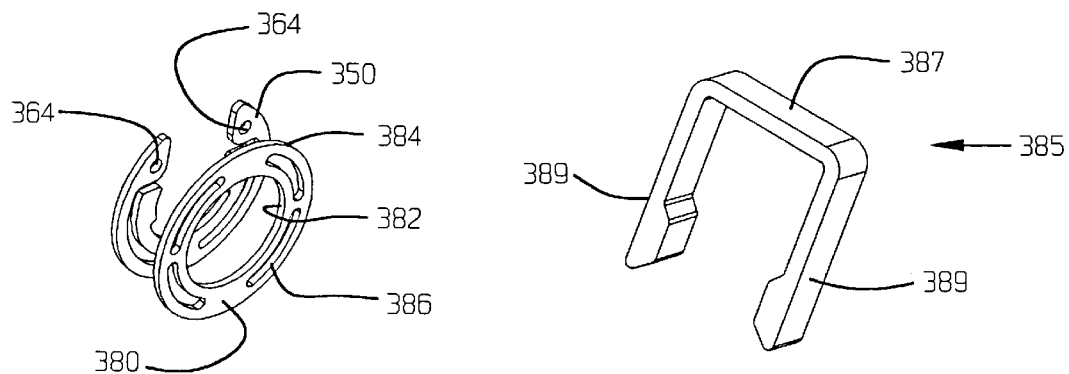
FIG 22A
FIG 22B
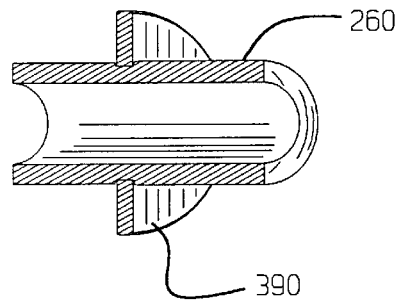
FIG 23
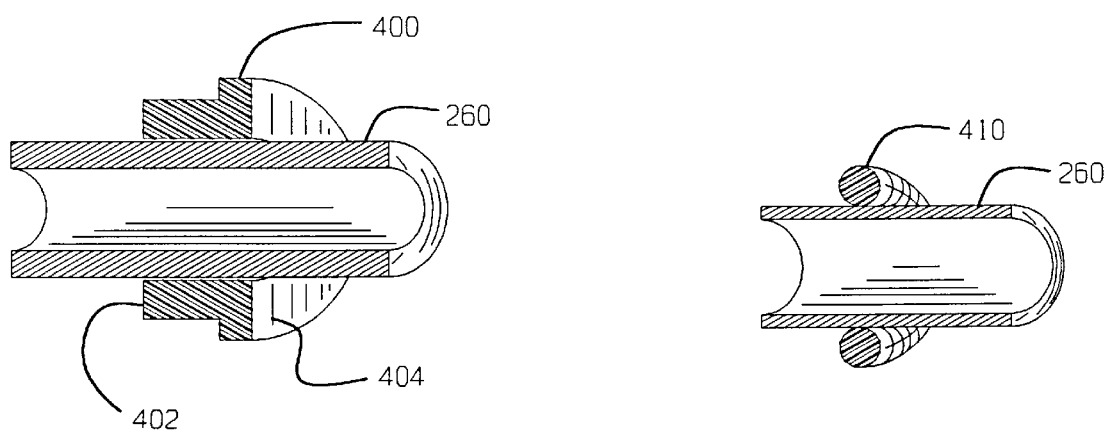
FIG 24
FIG 25

MEANS OF COUPLING NON-THREADED CONNECTIONS

CROSS REFERENCE TO RELATED APPLICATION

This application is a continuation-in-part of co-pending application Ser. No. PCT/US92/08007, filed Sep. 21, 1992.

BACKGROUND OF THE INVENTION

1. Field of the Invention

The present invention relates to a non-threaded connector assembly for providing a connection between male and female ends of fluid conveying conduits. The male conduit may be composed of either a substantially elastic material or a substantially non-elastic material. In a preferred embodiment, the male end includes an expanded annular region for securing a fastener for engagement with the female end.

2. Description of Related Art

In the automotive industry, as well as for many other industries, the need always exists for low cost, reliable and easy to assembly components. This need is especially apparent with respect to providing a connection between fluid conveying conduits such as fuel, brake, or refrigerant lines. Traditionally such a member is comprised of a male tubular member being retained within a female housing by a threaded fitting, by bolted-on flanged brackets, or by flare fittings.

More recently, snap together quick connect attachments have been used in place of the aforementioned conventional devices. In order to retain such a quick connector fastener, many tubular members include relatively complex fittings. The fittings may be integrally formed or mechanically attached on the outside surface of the male conduit. Furthermore, it is important that the fittings be carefully positioned at a predetermined longitudinal position on the male conduit in order to maintain a secure and leak resistant fit within the mating female housing or connector half. If such a connection were to become loose or were to leak, the vehicle could become disabled or could even pose a safety hazard to its occupants.

While such fasteners represent improvements within the art, the male and female components used in combination therewith have not adequately provided a low cost and secure sealing arrangement. Therefore, it would be desirable to have a conduit coupling which provides low cost, secure and integral sealing of the male and female components thereby avoiding the aforementioned problems.

SUMMARY OF THE INVENTION

In accordance with the present invention, the preferred embodiment of a conduit coupling is comprised of a male conduit, a mating female member, means for sealing, a bushing for restricting off-axis movement of the male conduit, and a retainer to couple the male conduit to the female member. The male conduit includes a conduit having a cylindrical cross sectional shape. The male conduit further preferably includes a blocking member such as a bulge, a shoulder, or a bead for locking the retainer against longitudinal movement with respect to the male conduit. The blocking member is in the form of an elevated area integrally formed on the male conduit or may be a member that is lockably attached to the male conduit.

In its integral form, the blocking member may be either a circumferential bead of material attached to the conduit or may be a bulged area formed on the conduit as part of the permanent form of the conduit. If the conduit is composed of a substantially non-elastic material such as a metal or a plastic, the bulged area may be formed by casting, molding, or deformation of the conduit during the production or finishing processes. Conversely, if the conduit is composed of a substantially elastic material such as a plastic or a rubber, the bulged area is formed by use of a rigid liner having a formed bulged area that is inserted into the elastic conduit. In low pressure and low pull-apart situations, the rigid liner may be omitted in favor of one of the methods employed on non-elastic material.

The female member comprises a receptacle having a cylindrical interior surface defining a bore. The shape of the bore is defined so as to accommodate the male conduit and the sealing means and to lockably engage the retainer.

The end configuration of the male conduit, either defined by the conduit itself or by the end of the rigid liner or by a separate end piece that extends along the conduit and forms the male end may engage a part of the inner bore of the female member. This construction, in combination with the bushing and, to a lesser extent, the seal and the retainer, allows rotation or swivelling of the male conduit with the female member, while restricting any off-axis play of the male conduit with respect to the female member. Relatedly, the retainer, in combination with the ring or bead provided on the male conduit, restricts axial and longitudinal movement of the male conduit with respect to the female member once the retainer is locked in place within the bore of the female member.

As noted, the male conduit may be formed from rigid, substantially non-elastic materials such as metal or a rigid plastic, or may be formed from relatively elastic materials such as a soft plastic but as part of the conduit.

The present invention discloses a variety of arrangements for sealing fluid including the provision of plural seals and also including seals of different shapes, such as O-ring seals. The present invention also discloses a variety of arrangements for providing radial support to the male conduit within the female member, such as tubular bushings and, to a lesser extent, strategically positioned washers and spacers. It is important to note that no longitudinal marks are left on the surface of the conduit that can disrupt the sealing.

Accordingly, the present invention includes many advantages over the prior art. The ring or bead acts to limit or to prevent entirely longitudinal movement of the male conduit once engaged with the female member while permitting rotational movement of the male conduit with respect to the female member. Furthermore, the ring or bead is relatively simple and inexpensive to fasten to or form on the male conduit, while providing an effective method of limiting movement in a first longitudinal direction while allowing movement in a second (rotational) direction.

In addition to the above features, an object of the present invention is to provide a connector assembly for providing a connection between fluid conveying conduits where the connector housing has a limited bore depth.

It is an additional object of the present invention to provide a swivelling conduit member which limits the separation forces exerted on the female member and the male conduit.

It is still a further object of the present invention to provide a retainer element which secures both the conduit and the sealing means within an axial bore of the female housing.

Additional objects and advantages of the present invention will become apparent from reading the detailed description of the preferred embodiments which make reference to the following set of drawings in which are shown the connection of the present invention in its various forms.

BRIEF DESCRIPTION OF THE DRAWINGS

FIG. 8 is a side elevation cross section showing a rigid male conduit having an integrally-formed bead;

FIG. 9 is a side elevation cross section of a male conduit formed from a substantially elastic material and having a rigid insert fitted therein;

FIG. 10 is a view similar to that of FIG. 9 but illustrating a flange formed on the end of the rigid insert to act as the inner bushing;

FIG. 11 is a side elevation particularly showing the circumferential bulge formed externally on a male conduit formed from a substantially elastic material;

FIG. 22A is a perspective view of the snap retainer ring of FIG. 21A in spatial relation to a loose ring;

FIG. 22B is a perspective view of an alternate type of retainer for use in conjunction with other assemblies of the various figures for the purpose of retaining the male portion with the sealing means in a female portion of the connector;

FIG. 23 is a cross section, perspective view of a male conduit having a ring locked thereto;

FIG. 24 is a cross section, perspective view of a male conduit having a slidable pusher for installation of the retainer into the female member;

FIG. 25 is a cross section, perspective view of a male conduit having an O-ring to prevent a snap retainer ring from axially moving along the conduit away from the end of the conduit;

DETAILED DESCRIPTION OF THE PREFERRED EMBODIMENTS OF THE PRESENT INVENTION

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

A conduit coupling according to the present invention can be used to join a pair of mating tubular members or conduits to one another. For example, brake, coolant, pneumatic or other semi-rigid conduits or flexible hoses may be attached to one another within an automotive vehicle or some other device. A conduit coupling can also be used to join a conduit to a fluid-carrying structure. For example, a flexible or rigid conduit may be coupled to an engine block, radiator or carburetor.

Figure 1:
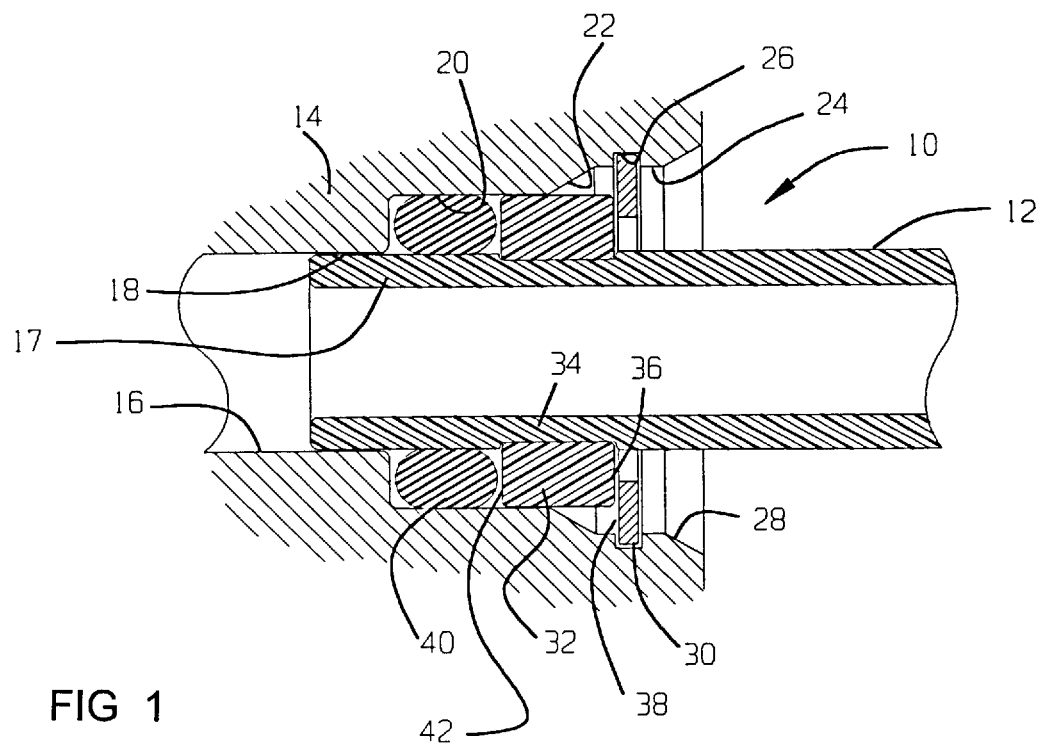
FIG. 1 is a side elevation cross section of a preferred embodiment of the connection of the present invention.

Referring to FIG. 1, a connection assembly, generally illustrated as 10, is shown. The connection 10 includes a male conduit 12 and a female member 14. The conduit 12 is sealingly mated to the female member 14. The female member 14 is shown in FIG. 1 as a machined port in some device, but it is to be understood that the female member 14 could be any of several structures and materials, such as a substantially tubular member having a thin wall outside of the internal bore.

To the end of achieving the present invention, however, it is minimally necessary that the female member 14 include an axially formed central passageway 16 to receive the end 17 of the fluid carrying male conduit 12, a first bore 18, a second bore 20 that is wider than the first bore 18, a tapered bore 22 leading into the second bore and having a tapered angle that is less than 45° as measured from the central axis of the bore 16, a third bore 24 that is wider than the second bore 20, and a retainer bore 26 that is larger in diameter than the third bore 24. It is into the combination of bores 18, 20, 22, 24, and 26 formed in the female member 14 that the male conduit 12 is fixedly inserted to define the connection 10. The tapered bore 22 assists in the insertion process by reducing the outer diameter of the fluid seal (discussed below) such that it may be fitted into the bore 20.

Associating the third bore 24 with the external area of the female member 14 is a lead-in portion 28. The chamfer 28 is formed to provide an area that is gradually reduced in diameter toward the third bore 24. In cases of a quick connect, tapered bore 28 acts to reduce the outer diameter of the retainer before the retainer springs back to lock in bore 26.

A spring retainer 30 provides retention between the male conduit 12 and the female member 14. Also provided in the connection 10 is a bushing 32 that, as illustrated, is assembled onto the male conduit 12 at a position, generally illustrated by 34, that is far enough back from the end 17 of the conduit 12 so as to accommodate "piloting" in the passageway 16. The bushing 32 includes an outer side 36 that is positioned roughly adjacent to an inner wall 38 of the retainer 30.

The relationship of the bushing 32 with respect to the end 17 of the male conduit 12 is such that length enough for a seal 40 to be fitted while leaving room enough in the second bore 20 to provide a seal retaining and piloting function of the bushing 32 in combination with the seal 40 within the bore 20. The bushing 32 is also long enough to allow for the outer side 36 of the bushing 32, according to the present embodiment, to engage the retainer 30. According to this construction, forces are transferred that would otherwise separate the conduit 12 from the female member 14, and retain the seal 40 within the second bore 20 against an inner side 42 of the bushing 32.

Accordingly, the spring retainer 30 acts to receive these separation forces on the conduit 12 from the bushing 32 and transfers these forces to the female member 14 by means of the rear wall of the retainer bore 26 which is formed in the third bore 24 of the female member 14. As now may be more clearly understood, the lead-in chamfer 28 serves to lead in the retainer 30 whereby the retainer 30 is structured such that upon insertion of the male conduit 12 into the female member 14, the overall diameter of the retainer 30 is reduced as the retainer is squeezed toward the central axis of the conduit 12 according to the form of the lead-in chamfer 28. Tools are required for installation and removal as set forth below with respect to FIGS. 20A and 20B. Also, FIG. 1 is not a quick connect type of connector, so no provision has been made to prevent the retainer from moving further away from the conduit end 17 when not connected.

Perhaps the most important feature of this type of connector is that the conduit 12 itself may be used for the male portion of the connection 10. This allows the conduit 12 to be finished on the outside in the area of the seal 40 with a surface consistent with the requirements for sealing on the inside of the connection 10. In addition, while FIG. 1 illustrates the bushing 32 as being a separate part of the assembly, the present construction allows the conduit 12 to have an integral expanded diameter area that functions as the bushing 32, combining the functions of seal retention, piloting in the seal bore 20, and cooperation with the retainer 30. Also, this combination of functions allows the retaining and sealing of a conduit in the length (or depth) that is presently devoted to thread-in or flared thread-in connections (neither shown).

An additional advantage of the design of the present invention over thread-in style connections is that this construction allows the conduit 12 to swivel or rotate with respect to the female member 14. Swiveling reduces the forces that may be applied to the connection 10 and thereby reduces the forces that may be applied to the conduit 12. By using the connection shown in FIG. 1, a manufacturer has the option of providing a female "port" of the same depth for threaded or flared connections or for the connection of FIG. 1. The connection 10 also allows the use of an elastomeric (i.e., more easily deformed than metal) tube and a seal such as seal 40 for more reliable sealing of the connection 10.

As is clear from illustration of FIG. 1, the bushing 32 is important in allowing the swivelling function by providing a bearing surface which is in rotatable contact with the bore 20. The bushing 32 also functions to prevent longitudinal movement of the conduit 12, thus preventing the conduit 12 from being withdrawn accidentally.

Bushings similar to the bushing 32 are disclosed throughout the following discussion with respect to the various figures. Many of the bushings lock onto the male conduit and thus restrict axial movement of other components of the connectors, such as, in the case of the embodiment of FIG. 1. While the axial movement of some of the other components, such as seals, washers, and spacers, may as well be restricted by a locked bushing. Conversely, some of the bushings discussed below are not locked to the conduit and thus do not restrict longitudinal movement of the various components. These bushings, however, are provided with a stop on the conduit and serve the additional function of providing a bearing surface for rotational contact with an area of the throughbore. The form of bushing depends on the requirements of the particular connection.

Figure 2:
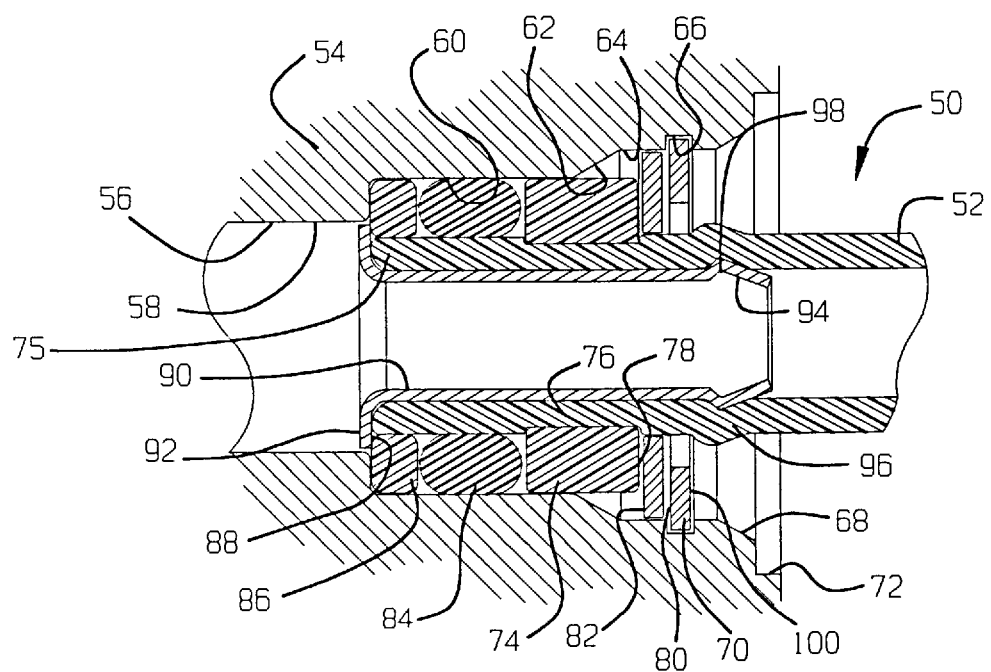
FIG. 2 is a side elevation cross section of an alternate embodiment of the connection of the present invention.

With the reference to FIG. 2, an alternate embodiment of the present invention is illustrated in cross section. This embodiment, while having differences structurally as will be explained below, has many of the advantages and features discussed above with respect to the embodiment of FIG. 1. FIG. 2 illustrates an alternate connection, generally illustrated as 50. The connection 50 includes a male conduit 52 and a female member 54. significantly, the male conduit 52 may be composed either of a substantially elastic, rigid material such as a metal or a hard plastic, or may be composed from a substantially elastic material, such as a soft and pliable plastic, with modifications being made to the connection 10 as will be described below.

The female member 54 includes an axially formed central passageway 56. The central passageway 56 includes a first bore 58, a second bore 60 having a larger diameter than the first bore, a tapering down bore 62 that is less than 45° per side angle as measured from the center axis of the passageway 56, a third bore 64 that is larger in diameter than is the second bore 60 and having a retainer bore 66 formed therein, and a lead-in chamfer 68 that serves to lead in a spring retainer 70. The chamfer 68 terminates at a fourth bore 72.

A bushing 74 is fitted adjacent the retainer 70. The bushing 74 defines a seal holding, conduit centering (with the passageway 60), and retainer-cooperating function. The bushing 74 is assembled onto the conduit 52 at a distance far enough from the end 75 to accommodate "piloting" in the passageway 60 while still allowing room for a seal as will be discussed below. The position of the bushing 74 is also such that some of its length is provided adjacent the tapering down bore 62.

The bushing 74 is locked (by such means as, for example, crimping) to the male conduit 52 at an approximate location 76. The bushing 74 includes an outer wall 78 that opposes an inner wall 80 of the retainer 70 with the aid of an intermediary. Disposed between the outer wall 78 and the inner wall 80 is an intermediate retainer element 82. When one is trying to accommodate standard readily available components and make a connection 50 which requires no more depth and diameter than a thread-in, flare, or seal type of connection, then it is sometimes desirable to use the intermediate retainer element 82 when the inside diameter of the retainer (FIGS. 20A and 20B) does not properly abut the rear diameter of the bushing 74.

A seal 84 is also provided on the conduit 52. The surface outside of the conduit 52 is furnished so as to provide a fluid-tight seal therebetween, as is the surface of the second bore 60. The surface of the conduit 52 remains smooth for sealing because no cutting tool is "lifted" away after having cut into a larger diameter. Upon insertion of the male conduit 52 into the female member 54, the tapering down bore 62 reduces the outer diameter of the seal 84 such that it may be fitted into the bore 60.

An additional inner bushing 86 is provided to retain the seal 84 on the conduit 52. The bushing 86 rests against a radial wall 88 formed on a flange 92 of a substantially tubular sleeve 90 that is disposed within conduit 52. Bushing 86 also restricts longitudinal and radial translation of the conduit 52 and its associated elements on the inside of the bore 60.

The substantially tubular sleeve 90 is fitted within the conduit 52. The sleeve 90 includes a flange 92 that acts to retain the bushing 86, the seal 84, and the bushing 74 (if it were loose on the conduit 52) on the conduit 52.

The conduit 52 may itself be composed of a substantially elastic or rigid material (such as a metal or a plastic) or a substantially elastic material (such as a soft plastic or other elastomer). A considerable portion of the sleeve 90 is positioned under (on the inside of the conduit 52) the squeezed-on bushing 74 which also may be assembled to the conduit 52 by squeezing the wall of conduit 52 between the outside diameter of the sleeve 90 and the inside diameter of the bushing 74 in the area 76. Additionally, when used with a conduit that is composed of a substantially elastic material, the sleeve 90 provides a rigidifying effect to the conduit.

If the male conduit 52 is formed from an non-elastic material, the bulge 96 may be formed integrally with the conduit. Alternatively, if the conduit 52 is formed from an elastic material, the bulge 96 is formed in response to a backing bulge 98 formed on the sleeve 90. The bulge 96 would limit longitudinal translation of a loose sleeve 74 along the conduit 52.

With FIGS. 1 and 2 thus described, several of the remaining figures will refer to various embodiments of bushings, seals, washers, or spacers that may be fitted to different conduits. It must be understood that, generally, many of these components are interchangeable from one embodiment to the next and, accordingly, the description of the invention set forth herein should not be understood as limiting the applicability of such components.

Figure 3:
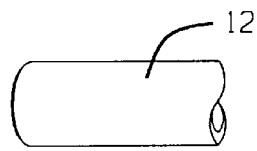
FIG. 3 is a side elevation showing the male conduit composed of a substantially elastic material prior to insertion of a rigid forming insert.

Referring to FIG. 3, a side elevation of the male conduit 12 is shown. The illustrated section of the conduit 12 is smooth and, as set forth above, may be composed of either a substantially elastic or substantially non-elastic material.

Figure 4:
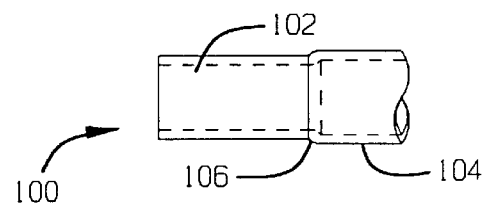
FIG. 4 is a side elevation showing an embodiment of the male conduit of the present invention in partial cross section and formed from a rigid, substantially non-elastic material.

FIG. 4 shows a side elevational view of an embodiment of the male conduit of the present invention. The conduit, generally illustrated as 100, includes an area of reduced diameter 102 and an area of enlarged diameter 104. An intermediate area defines a blocking shoulder 106 for blocking axial movement of a retainer or bushing (neither shown) away from the end of the conduit. The blocking shoulder 106 is the equivalent of the blocking bulge 96 shown in FIG. 2 and discussed in relation thereto.

The conduit 100 is composed of a substantially rigid material such as a metal or a plastic and, as such, requires no inner rigidifying sleeve.

Figure 5:
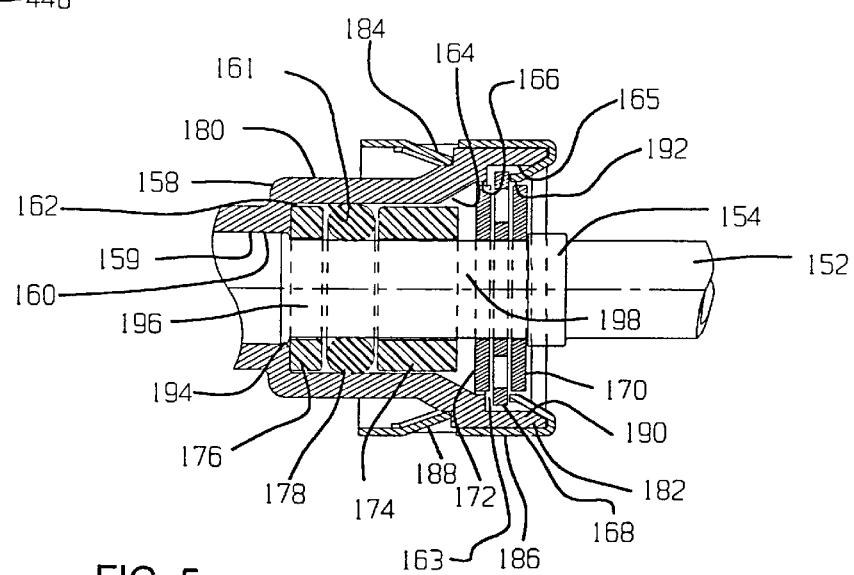
FIG. 5 is a side elevation cross section of an additional alternate embodiment of the connection of the present invention that shows a locking sleeve fitted over the female member to restrict release of the retainer and its associated male conduit.
Figure 21A:
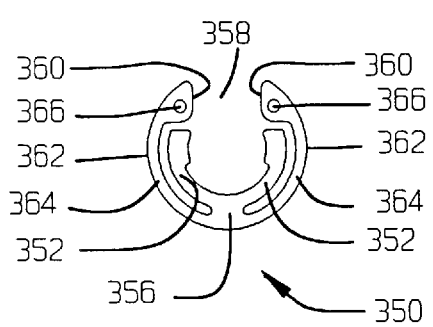
FIG. 21A is an end elevational view of a third preferred embodiment of a self-centering snap retainer ring for attaching the male conduit to the female member.
Figure 21B:
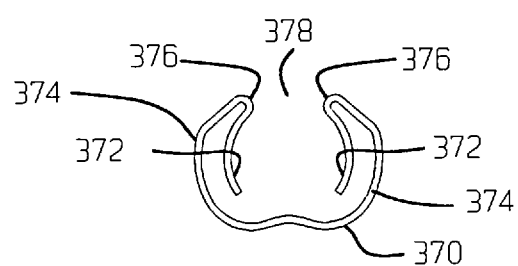
FIG. 21B is an end elevational view of a fourth preferred embodiment of a self-centering snap retainer ring for attaching the male conduit to the female member.

FIG. 5 shows a side elevation cross section view of an additional alternative embodiment of the present invention that illustrates an alternate method of locking a male conduit to a female member using FIGS. 21A, 21B, or 22A. The quick connection, generally illustrated as 150, includes a male conduit 152 having a blocking bulge 154 circumferentially and integrally mated with the conduit 152. The blocking bulge 154 operates in a manner identical to that of the bulge 98 formed on the conduit 52 of the embodiment of FIG. 2. Specifically, the bulge 154 prevents translation of the retainer outward away from the end of the conduit 152.

The connection 150 also includes a female member 158. Unlike the female members 14 and 52 of FIGS. 1 and 2 respectively, the female member 158 is not formed within a housing such as a master cylinder housing. Rather, the female member 158 is more or less elongated and tubular in shape, having outer walls of different diameters, as will be set forth below.

The female member 158 includes an axial throughbore or passageway 159 having a first bore 160, a second bore 161 that is wider than the first bore 160, a radial wall 162 connection the first and second bores 160 and 161 respectively, and a tapering down bore 164 that is preferably less than 45° per side angle as measured from the center axis of the first bore 160 and terminating at washer bore 163. The passageway 159 also includes a third bore 165 and a radial wall 166 formed between the bore 163 and the third bore 165.

Fitted on the male conduit 152 is a retainer 168 that may be one of any of the retainers discussed below with respect to FIGS. 21A, 21B, and 22A. Adjacent the retainer 168 are preferably provided a first washer 170 and a second washer 172. The first washer 170 (FIGS. 19, and 380 in FIG. 22A) is disposed between the blocking bulge 154 and the retainer 168, while the second washer 172 (FIG. 18) is positioned on the opposite side of the retainer 168. As illustrated, the second washer 172 snugly fits within the washer bore 163. First washer 170 fits against 106 of FIG. 4.

A bushing 174 is provided in spaced apart relation from the second washer 172. The bushing 174 is a seal-abutting and conduit-centering member that is fitted onto the conduit 152 at a distance far enough from the end of the conduit so as to accommodate "piloting" in the passageway 160. The outer diameter of the bushing 174 fits within the second bore 161 and thus provides radial support to the conduit 152 while still allowing its rotation. A washer 176 is also provided on the conduit 152 and, similarly, includes an outer diameter that engages the second bore 161.

Disposed between the bushing 174 and the washer 176 is a seal 178 which is preferably an elastomeric O-ring and is preassembled to the male conduit 152. The seal 178 could alternatively consist of a closed cell sponge-like material, a pumpable sealant, a thumb grade sealant, or other sealing means known to those skilled in the art. Upon entry of the conduit 152 into the female member 158, the tapering down bore 164 reduces the outer diameter of the seal 178 so that it can pass into the bore 161.

The male conduit 152 terminates at a flange 194. A surface to hold the washer 176 onto the conduit 152 is formed between the flange 194 and the bulge 154. The bushing 174, the washer 176, and the seal 178 are provided on the surface 196, as are the washer 170 and 172 as well as the retainer 168. Thus constructed, the flange 194 retains the washer 176 (as well as the seal 178 and the bushing 174) on the conduit 152. The flange 194 also has an outer diameter which is rotatably matable with the first bore 160 of the passageway 159. Coupled with the washer 176, bushing 174 virtually eliminates off-axis movement of the conduit 152 with respect to the female member 158.

The female member 158 includes a first outer peripheral wall 180 and a second outer peripheral wall 182, the latter being larger in diameter than the former. A radial wall 184 connects the wall 180 and the wall 182. A locking sleeve 186 formed from a deep drawn extruded metal is provided to lock the retainer 168 in place. The sleeve 186 includes a plurality of downwardly depending tabs 188 that lockably engage the wall 184. A retainer 168 locking function is achieved by an inwardly depending wall 190 that terminates at a tubular surface 192, the end of which is locked against the retainer 168. The outer peripheral surface of the first washer 170 is more or less snugly fitted within the tubular surface 192. The lead-in wall 190 functions in the same manner as the chamfer 28 and 68 of the embodiments of FIGS. 1 and 2 respectively, but to squeeze the retainer upon insertion as required in a quick connector.

Figure 6:
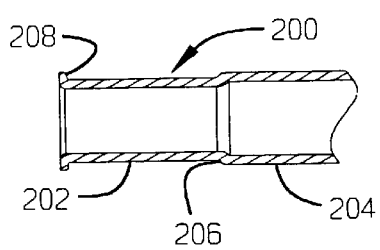
FIG. 6 is a side elevation showing a rigid male conduit including a flanged end for retaining one or more bushings and seals fitted to the conduit.

Referring to FIG. 6, a side elevation view of an alternate embodiment of a rigid male conduit, generally illustrated as 200, is illustrated in cross section. The male conduit 200 is similar to the conduit 100 of FIG. 4, and includes an area of reduced diameter 202 and an area of enlarged diameter 204. An intermediate area 206 connecting the area of reduced diameter 202 with the area of enlarged diameter 204 defines a blocking shoulder 206 for blocking axial movement of a retainer (not shown) away from the end of the conduit.

The conduit 200 has a flange 208 formed on its end. The flange is provided to retain the seal, the bushing, and any washers (none shown) on the conduit, as shown in FIG. 5. Like the conduit 100 of FIG. 4, this embodiment is formed from a substantially non-elastic material such as a metal or a rigid plastic.

Figure 7:
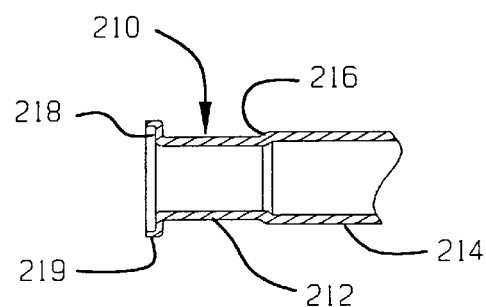
FIG. 7 is a side elevation showing a rigid male conduit including a flanged end having a larger diameter relative to the tubular portion of the conduit than the conduit shown in FIG. 6 which additionally acts as the inner bushing.

FIG. 7 shows yet another embodiment of male conduit, generally illustrated as 210. The conduit 210 includes an area of reduced diameter 212 and an area of enlarged diameter 214 having a blocking shoulder 216 formed therebetween. The male conduit 210 also includes a flange 218 formed at its end. To the extent that the flange 218 performs a retaining function like the flange 208 formed on the conduit 200 shown in FIG. 6. However, and in addition, the flange 218 performs an additional function in that it includes an outer surface 219 that is a bearing surface which rotates on a portion of the throughbore (see 161 in FIG. 5) defined in the female member, thus providing radial support and providing some longitudinal translation limitation for the conduit 210.

FIG. 8 is a side elevation cross section view illustrating another form of the male conduit which, in this instance, is a conduit 220. In lieu of a blocking bulge or a blocking shoulder, the male conduit 220 of the embodiment of FIG. 8 includes a blocking bead 222. The bead 222 is used in conjunction with a substantially non-elastic conduit. In the case of a polymerized conduit (such as a plastic), the bead 222 would be formed as in FIG. 11. In either form, the bead 222 functions to prohibit longitudinal translation of the retainer along the conduit by the retainer (see FIG. 22A).

While FIGS. 4 through 8 (excepting the seal, washer, outer bushing and retaining structure of FIG. 5) disclose conduits formed from rigid materials and thus define blocking structures rigidly fixed to rigid conduits, FIGS. 9 through 11 disclose conduits that are formed from substantially elastic materials.

Referring to FIG. 9, the conduit 52 from the connection 50 of FIG. 2 is illustrated. The conduit 52 includes a rigidifying sleeve 230 having a flange 232 and an enlarged or expanded end 234. The enlarged or expanded end 234, being formed from a rigid material, acts on the conduit 52 to form a circumferential blocking bulge 236.

FIG. 10 illustrates an alternate embodiment of the male conduit assembly of the present invention in which the substantially elastic male conduit 52 has fitted therein a rigidifying sleeve 240. A flange 242 is formed at one end of the sleeve 240, while the other end of the sleeve 240 defines an enlarged or expanded end 244. The end 244 acts on the elastic material of the conduit 52 to define a blocking bulge 246.

As may be seen, the flange 242 is larger in diameter than the flange 232 of the embodiment of FIG. 9, and includes an outer surface 248 that is a bearing surface and functions, like the bearing surface 219 of the conduit 210 discussed above with respect to FIG. 7, to provide radial support for the conduit 52 within the female member (not shown).

FIG. 11 is a side elevation view of the conduit 52 having the blocking bulge 98. This bulge 98 is similar to the bulge 222 of FIG. 8. This figure illustrates the clearly defined structure of the bulge 98 with respect to the conduit 52.

As illustrated above with respect to FIGS. 1, 2, and 5, an array of seals, bushings, spacers, and washers may be used in combination with the connectors represented by the present invention. FIGS. 12 through 19 illustrate various embodiments of these elements.

Figure 12:
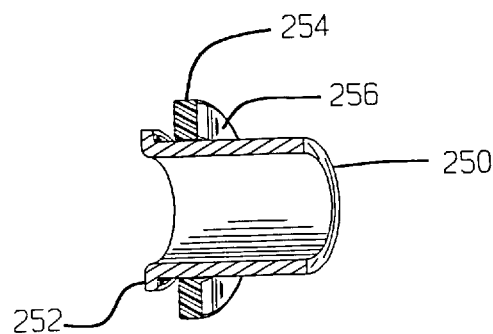
FIG. 12 is a cross section, perspective view of a flanged male conduit having a bushing that is loosely fitted to the conduit and illustrating a flange adjacent to the bushing.

With respect to FIG. 12, a cross section, perspective view of a rigid flanged male conduit 250 having a flanged end 252 is illustrated. A washer 256 is loosely provided on the conduit 250 and has an outside diameter 254 that acts to limit the radial movement of the conduit in the seal bore (see 161 in FIG. 5).

Figure 13:
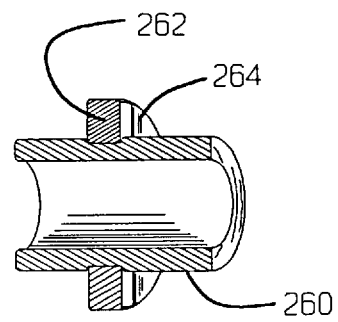
FIG. 13 is a cross section, perspective view of a straight male conduit having an inner bushing (adjacent the conduit's end) that is locked to the conduit.

FIG. 13 illustrates a perspective cross section of a portion of a substantially non-elastic male conduit 260 having a bushing 262 that is locked to the conduit 260.

Figure 14:
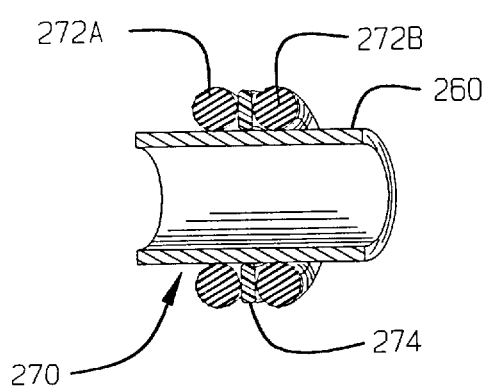
FIG. 14 is a cross section, perspective view of a male conduit having a pair of O-rings with a spacer therebetween.

FIG. 14 is a cross section, perspective view of a seal, spacer, and conduit assembly generally illustrated as 270. The assembly 270 includes a pair of seals 272A and 272B separated by a spacer 274. The seals 272A and 272B are preferably elastomeric O-rings which are preassembled to the male conduit 260. The seals 272A and 272B could alternatively consist of a closed cell sponge-like material, a pumpable sealant, a thumb grade sealant, or other sealing means known to those skilled in the art. The surface of the conduit 260 adjacent the seals 272A and 272B is preferably such that a fluid-tight seal is formed between the surface and the seals. Similarly, the area of the throughbore of the female member (not shown) contacted by the outer diameters of the seals 272A and 272B is likewise finished to form a fluid-tight seal.

Figure 15B:
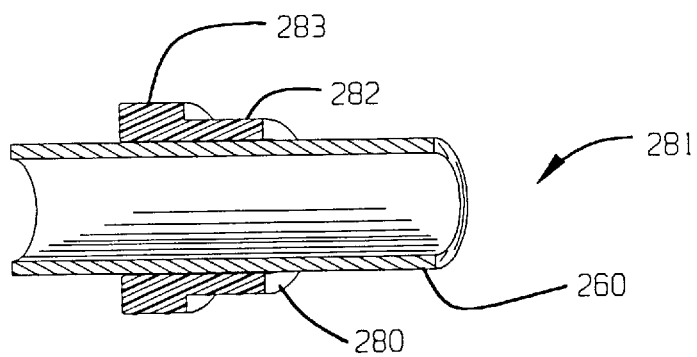
FIG. 15B is a cross section, perspective view of a male conduit having a flanged outer bushing positioned upstream of the conduit end that is loosely fitted to the conduit.
Figure 15A:
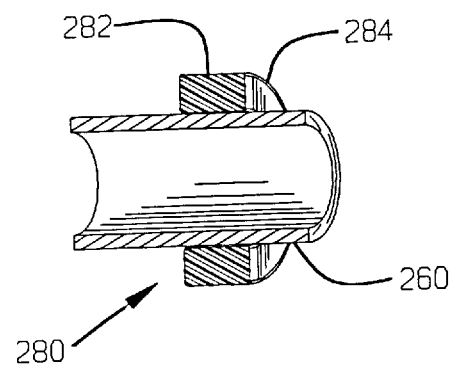
FIG. 15A is a cross section, perspective view of a male conduit having an outer bushing (that is, positioned upstream of the conduit's end) that is loosely fitted to the conduit.

FIGS. 15A and 15B illustrate an alternate assembly of a conduit, and outer bushing generally illustrated as 280. Specifically, the assembly 280 shown in FIG. 15A includes a bushing 282 that is loosely fitted to the conduit 260. As may be seen, the bushing 282 is wider than the bushing 262 of FIG. 13. In FIG. 15B, a flange 283 has been added to the bushing 282. The flange 283 functions to abut the retainer that is shown in FIGS. 20A, 20B, 21A, 21B, and 22B.

Figure 16A:
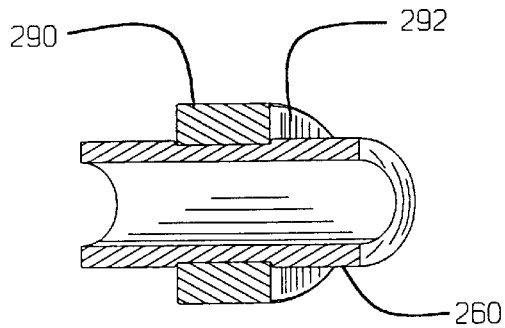
FIG. 16A is a view similar to that of FIG. 15A but illustrating an outer bushing that is locked to the male conduit.
Figure 16B:
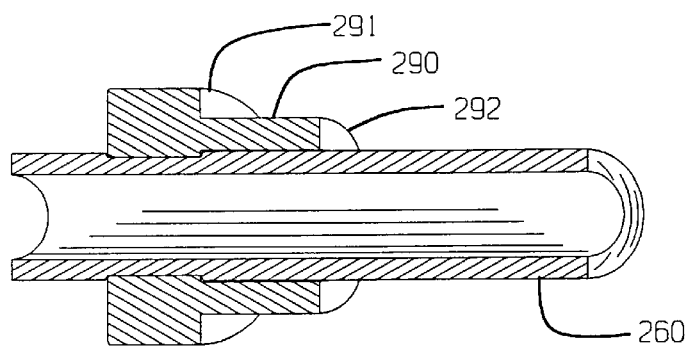
FIG. 16B is a view similar to FIG. 15B but illustrating an outer bushing that is locked to the male conduit.

FIGS. 16A and 16B illustrate embodiments of a bushing and conduit. Specifically, and with respect to FIG. 16A, a bushing 290 is locked to the conduit 260 by crimping or similar locking means. This contrasts with the loosely fitted bushing 280 of FIGS. 15A and 15B. With respect to FIG. 16B, a flange 291 has been added to the bushing 290. This flange 291 functions to abut the retainer that is shown in FIGS. 20A, 20B, 21A, 21B and 22B.

Figure 17:
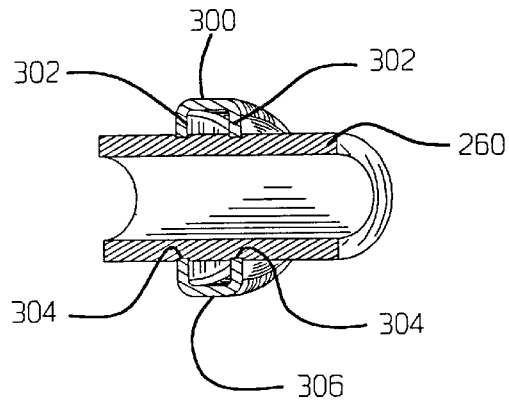
FIG. 17 is a cross section, perspective view of a male conduit having a self-squeezing ring locked thereto.

FIG. 17 illustrates a cross section, perspective view of the male conduit 260 having a self-squeezing ring 300 squeezed thereon. The ring 300 is an open ended, substantially round member, and includes a pair of opposed outer surfaces 302, and a pair of flanges 304 which extend inwardly from a tubular band 306. The ring 300 is typically manufactured such that the ring is split whereby a pair of ends (not shown) naturally abut. Details of this arrangement may be seen in co-pending U.S. patent application Ser. No. 295,916, owned commonly by the assignee of the present invention, and incorporated by reference. The ring 300 is formed of a highly resilient material, such as high gauge steel, which imparts springy characteristics and allows the ring 300 to make controlled depressions in the surface of the conduit 260, and function as an abutment on the conduit 260.

Figure 18:
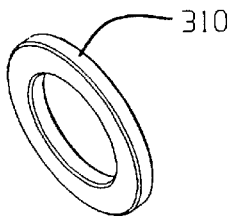
FIG. 18 is a perspective view of a washer that is positionable on either side of the self-squeezing ring of FIG. 17.

FIG. 18 is a perspective view of a washer 310 that is positionable on either the inner side or the outer side of the self-squeezing ring 300 illustrated in FIG. 17 and discussed above in relation thereto. The washer 310 may be stamped from a sheet of steel or molded from a plastic, or may be formed according to other methods from other materials.

Figure 19:
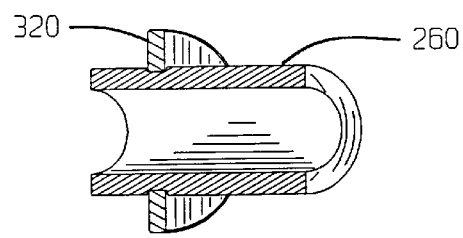
FIG. 19 is a cross section, perspective view of a male conduit having a locked ring positioned thereon on the inner side or outer side of a retainer.

FIG. 19 is a cross section, perspective view of the male conduit 260 having a locking ring 320 crimped thereto. (Various preferred embodiments of the retainer rings of the present invention are discussed below with respect to FIGS. 20A, 20B, 21A, and 21B.) Like the ring 300 discussed above with respect to FIG. 17, the ring 320 provides a blocking wall for attachment on the inner and outer side of a retainer. Also like the ring 300, the ring 320 is formed from a highly resilient material, such as a high gauge steel, which imparts springy characteristics and allows the ring 320 to be selectively deformed for locking on the male conduit 260. An expansion of the conduit is needed (see FIGS. 4, 6, 7, 8, 9, 10, and 11), or a ring (like 320 in FIG. 19) is used on the outer side of a self-centering ring like retainer, to hold the retainer in position when quick connecting or to withstand pull-apart forces.

Figure 20B:
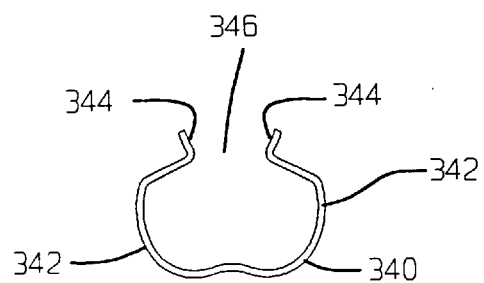
FIG. 20B is an end elevational view of a second preferred embodiment of a snap retainer ring for attaching the male conduit to the female member.
Figure 20A:
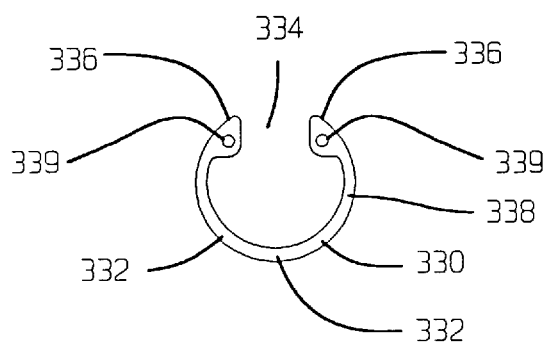
FIG. 20A is an end elevational view of a first preferred embodiment of a snap retainer ring according to the present invention for attaching the male conduit to the female member.

Referring to FIG. 20A, an end elevational view of a first preferred embodiment of a snap retainer ring 330 is illustrated. The ring 330 is a flat washer-like device that has a pair of connected jaws 332. The jaws 332 create a substantially circular shape. A gap 334 is defined between a distal end 336 of each jaw 332. Moreover, a peripheral edge 338 of jaws 332 is inwardly compressed. When fully inserted into the female members 14 or 54 for example, the jaws 332 are outwardly urged for engagement within the retainer bores 26 or 56. The ring 330 is preferably made from a sheet of strip stock steel. Removal and installation may be undertaken by use of a tool (not shown) which can be inserted within openings 339 in jaws 332.

FIG. 20B illustrates a second preferred embodiment of a snap retainer ring, generally illustrated as 340, for use with the present invention. The ring 340 is formed from a semi-flexible wire and includes a pair of opposed arms 342, each having an outwardly bent arm 344. The arms 344 define a space 346 therebetween. The ring 340 functions much the same way as the ring 330. Specifically, because the ring 340 is formed from a spring steel, the arms 342 are resiliently compressed toward one another upon insertion of the male conduit 260 into the female member 14. As with the ring 330, a tool (not shown) may be used for removal by engagement with the arms 344. The ring shown as 380 in FIG. 22A may also be used to facilitate tool use.

Referring to FIG. 21A, an end elevational view of a third preferred embodiment of a snap ring according to the present invention is shown and is generally illustrated as 350. Like the ring 330, the ring 350 is a flat washer-like device. However, the ring 350 is structurally different from the ring 330. The ring 350 has a pair of central jaws 352, also known as a central attachment section, and a pair of outer jaws 364, also known as an outer attachment section. The central jaws 352 and the outer jaws 364 are connected to each other through a neck section 356. Furthermore, central jaws 352 define a substantially semi-circular shape therebetween which is compressibly affixed around the outer surface of the male conduit 260. The outer jaws 364 create a substantially circular shape substantially concentric with the central jaws 352.

A gap 358 is defined between a distal end 360 of each outer jaw 364. Moreover, a peripheral edge 362 of the outer jaws 364 is inwardly compressed by the lead-in portion 28 when the male conduit 260 having the fastener 350 positioned thereon is longitudinally inserted within the female member 14. When fully inserted, the outer jaws 364 are outwardly urged such that the peripheral edges 362 engage the retainer bore 26. The retainer 350 is preferably made from a sheet of strip stock steel. Removal may be undertaken by use of a tool (not shown) which can be inserted within openings 366 formed in the outer jaws 364.

A fourth preferred embodiment of a snap-retainer ring according to the present invention is illustrated in FIG. 21B. A retainer, generally illustrated as 370, is shown in an end elevational view. The ring 370 is formed from a semi-flexible wire and has a pair of central jaws 372, also known as a central attachment section, and a pair of outer jaws 374, also known as an outer attachment section. The central jaws 372 and the outer jaws 374 are connected to each other through an elbow 376. A gap 378 is defined between the elbows 376. The central jaws 372 compressibly engage the male conduit 260, while the outer jaws 374 engage the retainer bore 26 of the female member 14.

FIG. 22A is a perspective view of the snap-retainer ring 350 of FIG. 21A in spatial relation to a loose ring 380. The ring 380 has an inner peripheral wall 382 and an outer peripheral wall 384. Concentrically defined about a central axis between the inner wall 382 and the outer wall 384 are a plurality of slots 386 that allow passage of the tips of a tool (not shown) to engage the openings 364 formed in the ring 350 for removal.

FIG. 22B is a different type of retainer used with a connection of the general type 10, of which FIG. 1 or 2 (not of the "quick connect" type) are examples. All of the figures of individual methods of dealing with flanges, expansions, bushings, washers, and seals, shown are applicable, and only FIGS. 20A, 20B, 21A, 21B, and 22A, are not applicable. The central theme of the present invention demonstrates that it is possible to construct a connector wherein the conduit itself becomes the male portion of a connector. It is possible to do this with various methods of construction as long as the sealing method (and sealing support) is constructed as shown.

In FIG. 22B the retainer is shown as element 385, with legs 389 and a central joining section 387. The center joining section 387 provides most of the springing of the legs 389 when it is desirable to have the legs 389 spring. It is not necessary in all applications to have a springing of the legs 389.

The retainer 385 transfers the pull-apart forces that are applied to the male and female portions of the connector, as well as prevents the expulsion from the connection of the sealing means. (It, like FIGS. 20A, 20B, 21A, 21B, and 22A, does this in cases when there are "loose on the male" bushings, and/or washers, between the sealing means and the retainer.)

The retainer and a flange on the end of the conduit (or an inner washer affixed to the conduit) that is shown in FIG. 22B is installed through the female portion of the connection, but a retainer (not shown) may be installed into the female, as illustrated in FIGS. 20A, 20B, 21A, 21B, and 22A, by means of expanding into a larger diameter.

FIG. 23 illustrates a perspective view of the male conduit 260 and a locking ring 390 shown in cross section. This ring 390 is for the purpose of preventing the movement of a retainer (not shown) on conduit 260.

FIG. 24 is a cross section, perspective view of the male conduit 260 having a slidable pusher 400 fitted thereto for installation of a retainer into the female member 14 when the assembly is to comprise a quick-connect type. The pusher 400 is positioned on the outer side of the retainer (not shown) and includes a retainer contacting side 402 and a flange 404 that may be grasped by the installer for installation of the retainer. The pusher 400 may be composed of any suitable material, although a plastic is preferred.

Referring to FIG. 25, a cross section, perspective view of an O-ring 410 in place on the conduit 260 is illustrated. The O-ring 410 is fitted to the conduit 260 to prevent the retainer from inadvertently moving down the conduit 260 away from the end of the conduit 260. This is a particularly useful feature where the male conduit 260 is a long fluid line such as a hydraulic brake line. The O-ring 410 is preferably formed from an elastomeric material which is preassembled to the male conduit 260. However, the O-ring 410 could alternatively consist of a closed cell sponge-like or rubber material.

Figure 26:
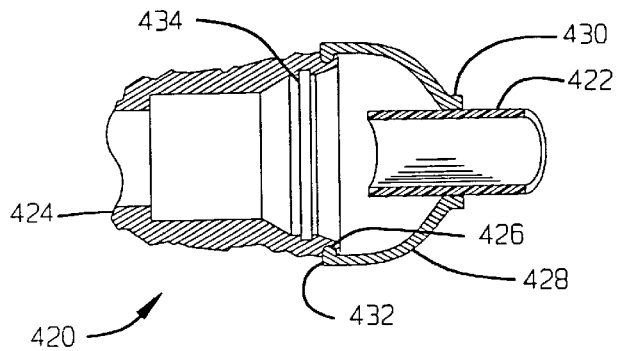
FIG. 26 is a side elevation cross section of an embodiment of the male conduit-female member connection according to the present invention having a protective boot fitted thereto.

FIG. 26 discloses a side elevation cross section view of a male conduit-female member connection, generally illustrated as 420. The connection 420 includes a male conduit 422 and a female member 424 having a peripheral groove 426 defined adjacent its opening. A protective boot 428 is provided to create a protective barrier about the male conduit 422 and the female member 424. The boot 428 includes a male conduit-engaging end 430 which sealingly engages the male conduit 422 and a female member - engaging end 432 having an inner rib which sealingly engages the peripheral groove 426 of the female member 424. The boot 428 is preferably composed of an elastomeric material such as a rubber or a soft plastic. The boot 428 operates to keep the connection between the male conduit 422 and the female member 424 free of debris such as dirt, dust, oil, or water.

Figure 27:
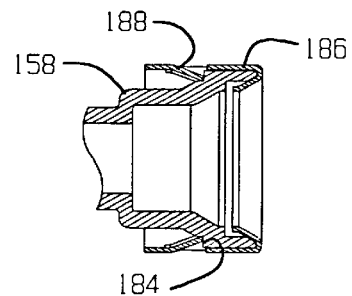
FIG. 27 is a side elevational cross section of a female member having fitted thereto the locking sleeve of FIG. 5.

FIG. 27 is a side elevational cross section view of the locking sleeve 186 fitted in its locked position into the female member 158. As illustrated in this view, the resiliently downwardly depending tabs 188 depend downward toward the central axis of the female member 158. The tabs 188 lockingly engage the radial wall 184 peripherally formed on female member 158. The sleeve 186 may be formed from a rigid plastic or metal.

Figure 28:
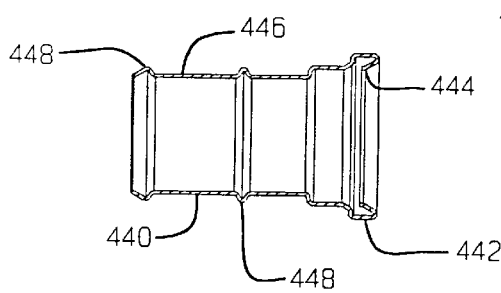
FIG. 28 is a side elevation cross section of a deep drawn, thin-walled metal embodiment of the female member.

FIG. 28 illustrates an alternate embodiment of the female member of the present invention which has particularly utility in situations where the female end must be remotely located at, for example, the end of a tube or conduit. This female member 440 is used when it is desired to provide a female portion on the end of a flexible (such as plastic) conduit. Accordingly, a female member 440 is illustrated as having a male conduit receiving end 442 into which is lockably engaged a male conduit (not shown) of the type shown in and discussed with respect to some of the figures of the present application. The female member 440 is a deep drawn, thin-walled metal tube. The member 440 includes an inner retainer abutment wall 444 against which the retainer rests to prevent withdrawal of the male conduit 260 from the female member 440.

The member 440 includes a male end 446 around which is placed an elastomeric tube or conduit (not shown). One or more peripheral ridges 448 are formed on the male portion of the member 440 to lock the tube thereon and to form a fluid-tight seal therewith. A male conduit and its associated washers, bushings, seals and retainer according to the types described herein may be used in conjunction with the female member 440 to form a connection. If a rigid, or semi-rigid, metal tube is to be terminate with a female portion, the male end 446 would accommodate the soldering, welding, or gluing that is necessary to attach female member 440.

Figure 29:
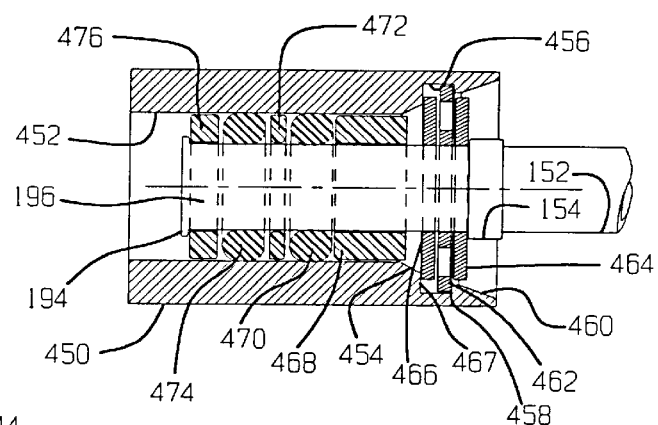
FIG. 29 is a side elevational cross section illustrating an alternate embodiment of the connection of the present invention and showing a male conduit with an integral bulge formed thereon and a self-centering snap retainer ring with washers on both its outer and inner sides and a loose inner bushing retained by a small flange provided at the end of the conduit.

Finally, with respect to FIG. 29, a connector is illustrated and includes the male conduit 152 of the type disclosed in and discussed with reference to FIG. 5 above and a female member 450. The male conduit 152 includes a blocking bulge 154 integrally formed with the conduit 152. Again as with the male conduit 152 of FIG. 5, the conduit 152 includes an end flange formed adjacent the surface of reduced diameter 196.

The female member 450 includes passageway 452 that defines a throughbore. Formed in the passageway 452 is a tapering down bore 454 that is preferably less than 45° per side angle as measured from the center axis of the bore, a retainer bore 456 having a front wall 458, and a lead-in chamfer 460 for reducing the diameter of the retainer upon insertion of the male conduit 152 into the female member 450. Similarly, the tapering down bore 454 reduces the outer diameters of the seals (discussed below) such that they can pass into the passageway 452.

A retainer 462 of the type variously disclosed herein is lockably engaged within the retainer bore 456 and abuts the wall 458 to prevent unintended withdrawal of the male conduit 152 from the female member 450. An outer washer 464 is disposed between the blocking bulge 154 and the retainer 462. An inner washer 466 is disposed between the retainer 462 and an inner radial wall 467 formed in the retainer bore 456. This arrangement of washers 464 and 466 effectively eliminates longitudinal movement of the male conduit 152 with respect to the female member 450 when the retainer 462 is engaged with the female housing 158.

A bushing 468 is provided in spaced apart relation from the retainer 462. The bushing 468 is a seal abutting end conduit centering member that is fitted onto the conduit 152 at a distance far enough from the flange 194 so as to accommodate "piloting" in the passageway 452 while still allowing room for a first O-ring seal 470, a first washer 472, a second O-ring seal 474, and a second washer 476.

The O-ring seals 470 and 474 are preferably formed from an elastomeric material which, like the bushing 468 and the washers 472 and 476, are preassembled to the male conduit 260. However, the seals 470 and 474 could alternatively consist of a closed cell sponge-like material, a pumpable sealant, a thumb grade sealant, or other sealing means known to one skilled in the art.

The first washer 472 is fitted between the two O-ring seals 470 and 474 as a spacer and to provide radial support to the male conduit 152. The second washer 476 is adjacent the flange 194 and, like the first washer 472, provides radial support for the conduit 152. Relatedly, the first and second washers 472 and 476 respectively, and to some extent the seals 470 and 474, assist in "piloting" the conduit 152 within the passageway 452 as does the bushing 468.

When the male conduit 152 is fully inserted into the female member 450, the bushing 468 along with the washers 472 and 476 provide bearing surfaces which inhibit axial misalignment in relation to the female member 450. Furthermore, the sealing seat created between the bushing 468 and the flange 194 accurately controls the radial compression and longitudinal locations of the seals 470 and 474.

Various methods of retaining and mounting seals and bushings have been shown for the connections that may be used in combination with the disclosed connection. These combined connectors were chosen to be representative of a type of connector that mounts a seal as shown, or uses bushings as shown, or employs a retainer that operates as shown. Many connectors that employ the shown method of mounting a seal, mounting a bushing, or of retaining, are of the type of connector that is shown. The present invention demonstrates that it is possible to use the conduit itself as a male portion of a connector that is used to confine pressures.

Regardless of the particular embodiment, the connectors of the present invention disclose several advantages over the prior art including their various possible source materials (such as essentially elastic or essentially non-elastic, rigid materials) while providing a secure, fluid-tight, convenient to use connector that resists undesired axial translation of a male conduit when locked in place while still allowing its rotation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. In combination a connector and a conduit for communicating a fluid media, the connector comprising:
   a female portion having a throughbore, said throughbore having an inner diameter, the female portion defining a port;
   a male portion releasably attachable to said female portion, said male portion having an end and an outer diameter such that said male portion is fittable within said inner diameter of said female portion, the male portion defining the conduit;
   a sealing cavity formed between said female and male portions;
   sealing means fitted to said male portion, said sealing means having a pair of sides, said sealing means further including a pilot area formed on each of said sides of said sealing means, said pilot areas including an outside pilot, said outside pilot being fittable into said sealing cavity between said female and male portions thereby preventing movement of said sealing means and the expulsion of said sealing means from said connector and for reducing axial movement between said female and male portions and to transfer forces that tend to separate said male portion from said female portion, a bushing fixed to said male portion, said bushing including a bearing surface for enabling rotation of said male portion with said female portion contacting said female through bore, and an annular retainer including two separate annular members both entirely positioned within said female portion, and at least one of said annular members seating on said male portion spaced from said bushing and said retainer for providing a non-threaded connection for holding said male and female portions in a sealed relationship.

2. The connector of claim 1, wherein said pilot area further includes an inside pilot having a diameter substantially equivalent to said inner diameter of said female portion which accepts said outer diameter of said male portion.

3. The connector of claim 1, wherein said end of said male portion has an outer diameter that is substantially equivalent to said outer diameter of the conduit.

4. The connector of claim 1, wherein said male portion includes an area having a diameter larger than said outer diameter of the conduit.

5. The connector of claim 3, wherein said pilot area is locked to said end of said male portion.

6. The connector of claim 1, where said outside pilot is locked to said male portion.

7. The connector of claim 1, further including means internal to the female portion to transfer forces tending to separate said male portion from said female portion.

8. The connector of claim 1, wherein said outside pilot further includes a male end exterior, said male portion having a larger diameter than said male end exterior.

9. The connector of claim 1, further including means to transfer forces tending to separate said male portion from said female portion that go through a wall of the female portion.

10. The connector of claim 1, further including a resilient ring to hold said male portion in said female portion, said resilient ring having a width and an outer diameter, said width being less than said outer diameter.

11. The connector of claim 1, further including an internal resilient ring to hold said male portion in said female portion, said male portion having a central axis and said ring having a central axis, said ring being positioned such that said central axis of said male portion is coaxially disposed with respect to said central axis of said ring, said ring being a self-centering ring.

12. The connector of claim 11, further including means to prevent said ring from translating away from said male portion along said conduit.

13. The connector of claim 1, further including an internal resilient ring to hold said male portion in said female portion, said ring having an outer diameter, and wherein said female portion includes a body, said body having a male portion insertion end, said throughbore terminating at a chamfered lead-in section formed in said insertion end, said chamfered lead-in end being formed whereby upon insertion of said male portion into said female portion, said outer diameter of said resilient ring is reduced upon insertion to a diameter sufficient to allow said ring to enter said throughbore of said female portion.

14. The connector of claim 13, further including means to force said ring into said chamfered lead-in section.

15. The connector of claim 1, wherein said female portion further includes means for reducing the outside diameter of said sealing means to said inner diameter of said throughbore.

16. The connector of claim 15, wherein said means for reducing comprises a chamfered wall.

17. The connector of claim 1, wherein said male portion includes a conduit, said conduit being composed of a substantially elastic material.

18. A connector assembly for attaching fluid-communicating conduits communicating a fluid media from upstream to downstream, said assembly comprising:
   a female member having a receptacle with a cylindrical interior surface defining a throughbore extending therethrough, said throughbore having an inner diameter, said female member defining a port;
   a male member, said male member being part of the conduit carrying the fluid from the upstream connection, said male member including:
      a male conduit having a cylindrical cross sectional shape and an exterior surface, said conduit having an end, a region of a first outer diameter, and a region of a second outer diameter, said first outer diameter being less than said second outer diameter when the conduit can be formed and said first outer diameter being equal to said second outer diameter when it is not desired to form the conduit;
      a seal fitted on said male conduit, said seal having an outer peripheral wall, said outer peripheral wall of said seal being rotatably matable with said throughbore of said female member, said seal substantially preventing the fluid media from passing between said exterior surface of said male conduit and said throughbore of said female member;
      first means for rotatably seating said male conduit within said throughbore of said female member said first means including a bearing surface for enabling rotation of said male portion with said female portion contacting said female through bore;
      second means for rotatably seating said male conduit within said throughbore of said female member and for permitting relative rotational movement therebetween;
      a retainer, said retainer including two separate annular members both entirely positioned within said female portion, and at least one of said annular members seating on said male portion spaced from said first means and said retainer for providing a non-threaded connection for holding said male and female portions in a sealed relationship.

19. The connector assembly of claim 18, wherein said throughbore of said female member generally defines a longitudinal axis, said throughbore having formed therein a first inner peripheral wall having a diameter and having a first central axis generally coaxial with said general longitudinal axis when an inner limitation of the conduit off axis movement is to the conduit outside diameter, said throughbore further having formed therein a second inner peripheral wall having a second central axis generally coaxial with said general longitudinal axis, said second inner peripheral wall having a diameter and being adjacent said first inner peripheral wall, said diameter of said second inner peripheral wall being greater than said diameter of said first inner peripheral wall, said second inner peripheral wall having defined therein a retainer-receiving bore.

20. The connector assembly of claim 19, wherein said female member further includes a chamfered lead-in wall formed between said second and third inner peripheral walls.

21. The connector assembly of claim 19, wherein said first inner peripheral wall includes a radial wall and wherein said seal is abuttable against said radial wall.

22. The connector assembly of claim 11, wherein said bore of said female member comprises a tapered entrance adapted for engagement with outer arm portions for effecting radial inward movement thereof and thereby piloting said retainer into said bore.

23. The connector assembly of claim 19, wherein said retainer generally defines a horse shoe configuration.

24. The connector assembly of claim 18, wherein said first means for rotatably seating is formed on said end of said male conduit.

25. The connector assembly of claim 18, wherein said first means for rotatably seating is a bushing fitted to said end of said male conduit.

26. The connector assembly of claim 19, wherein said second means for rotatably seating is a bushing.

27. The connector assembly of claim 26, wherein said bushing is locked to said region of said first outer diameter of said male conduit.

28. A connector assembly for use in communicating a fluid medium, said assembly comprising:
   a female member having a throughbore;
   a male conduit partially insertable into said throughbore of said female member to form a fluid-tight connection therewith, said male conduit having an end, said male conduit further having a retainer that transfers forces that tend to separate said male conduit from said female member, said throughbore of said female member receiving a portion of said male conduit leading to the connector assembly; and
   means for sealing said male conduit with respect to said female member to form said fluid-tight connection on said male conduit, said male conduit, and said sealing member being arranged between said conduit end and said retainer, a bushing fixed to said male portion, said bushing including a bearing surface for enabling rotation of said male portion with said female portion contacting said female through bore, and an annular retainer including two separate annular members both entirely positioned within said female portion, and at least one of said annular members seating on said male portion spaced from said bushing and said retainer for providing a non-threaded connection for holding said male and female portions in a sealed relationship.

29. The connector assembly of claim 28, wherein said male conduit defines a substantially tubular shape and wherein said male conduit portion, when assembled, has a first region of a first outer diameter and a second region of a second outer diameter, said first outer diameter being less than said second outer diameter, said region of said first outer diameter being disposed between said end of said conduit and said second region, said retainer being positioned on said region of said first outer diameter between said second region and said end.

30. The connector assembly of claim 28, wherein said sealing means comprises an O-ring seal that is positioned on said male conduit between said retainer and said end of said conduit.

31. The connector assembly of claim 29, wherein said sealing means comprises a seal, said seal being positioned on said male conduit between said retainer and said end of said conduit.

32. A connector assembly for attaching fluid-communicating conduits, said assembly comprising:

a female member having a receptacle with a cylindrical interior surface defining a bore extending therethrough, said bore defining a longitudinal axis, said bore having formed therein a first inner peripheral wall having a diameter and having a first central axis coaxial with said longitudinal axis, said bore further having formed therein a second inner peripheral wall having a second central axis coaxial with said longitudinal axis, said second inner peripheral wall having a diameter and being adjacent said first inner peripheral wall, said diameter of said second inner peripheral wall being greater than said diameter of said first inner peripheral wall, said second inner peripheral wall having defined therein a retainer-receiving bore;

a male member, said male member including:

a male conduit having a cylindrical cross sectional shape and an exterior surface, said conduit having an end, a region of a first outer diameter, and a region of a second outer diameter, said first outer diameter being less than said second outer diameter;

a seal fitted on said male conduit, said seal having an outer peripheral wall, said outer peripheral wall of said seal being rotatably matable with said first inner peripheral wall of said female member, said seal substantially preventing the fluid media from passing between said exterior surface of said male conduit and said inside surface of said female member;

first means for rotatably seating said male conduit with said first inner peripheral wall of said female member, said first means including a bearing surface for enabling rotation of said male portion with said female portion contacting said female through bore;

second means for rotatably seating said male conduit with said first inner peripheral wall of said female member, said seal being positioned between said first and second means;

a retainer, said retainer including two separate annular members both entirely positioned within said female portion, and at least one of said annular members seating on said male portion spaced from said first means and said retainer for providing a non-threaded connection for holding said male and female portions in a sealed relationship;

said seal, said region of said first outer diameter, and said retainer being operable to limit axial movement of said male member with respect to said female member while permitting said male member to be rotated with respect to said female member.

* * * * *